United States Patent
Zhang et al.

(10) Patent No.: US 11,639,177 B2
(45) Date of Patent: May 2, 2023

(54) ROAD FRICTION ESTIMATION TECHNIQUES

(71) Applicant: TUSIMPLE, INC., San Diego, CA (US)

(72) Inventors: Kun Zhang, San Diego, CA (US);
Xiaoling Han, San Diego, CA (US);
Weina Mao, San Diego, CA (US);
Zehua Huang, San Diego, CA (US);
Charles A. Price, San Diego, CA (US)

(73) Assignee: TUSIMPLE, INC., San Diego, CA (US)

( * ) Notice: Subject to any disclaimer, the term of this patent is extended or adjusted under 35 U.S.C. 154(b) by 95 days.

(21) Appl. No.: 17/022,875

(22) Filed: Sep. 16, 2020

(65) Prior Publication Data

US 2021/0086777 A1    Mar. 25, 2021

Related U.S. Application Data

(60) Provisional application No. 62/902,851, filed on Sep. 19, 2019.

(51) Int. Cl.
*B60W 40/068* (2012.01)
*B60W 10/18* (2012.01)
*B60W 30/14* (2006.01)

(52) U.S. Cl.
CPC .......... *B60W 40/068* (2013.01); *B60W 10/18* (2013.01); *B60W 30/146* (2013.01);
(Continued)

(58) Field of Classification Search
CPC ................................................ B60W 40/068
See application file for complete search history.

(56) References Cited

U.S. PATENT DOCUMENTS 11,136,021 B1* 10/2021 Funke ..................... B62D 7/159
2017/0101095 A1* 4/2017 Nilsson ..................... B60T 7/22
(Continued)

FOREIGN PATENT DOCUMENTS

DE 19861262 B4 12/2005
DE 102011111592 A1 2/2013
(Continued)

OTHER PUBLICATIONS

Extended European Search Report for European Patent Application No. 20196507.6, dated Feb. 11, 2021.

*Primary Examiner* — Imran K Mustafa
(74) *Attorney, Agent, or Firm* — Paul Liu; Glenn Theodore Mathews Perkins Coie, LLP

(57) ABSTRACT

Techniques are described for estimating road friction between a road and tires of a vehicle. A method includes receiving, from a temperature sensor on a vehicle, a temperature value that indicates a temperature of an environment in which a vehicle is operated, determining a first range of friction values that quantify a friction between a road and tires of a vehicle based on a function of the temperature value and an extent of precipitation in a region that indicate a hazardous driving condition, obtaining, from the first range of friction values, a value that quantifies the friction between the road and the tires of the vehicle, where the value is obtained based on a driving related behavior of the vehicle, and causing the vehicle to operate on the road based on the value obtained from the first range of friction values.

18 Claims, 2 Drawing Sheets

(52) U.S. Cl.
CPC .............. *B60W 2510/182* (2013.01); *B60W 2520/105* (2013.01); *B60W 2555/20* (2020.02)

(56) References Cited

U.S. PATENT DOCUMENTS

| | | | |
|---|---|---|---|
| 2017/0167881 A1* | 6/2017 | Rander | ............... G05D 1/0274 |
| 2019/0161085 A1 | 5/2019 | Dudar et al. | |
| 2019/0217864 A1* | 7/2019 | Kusukame | ......... G01C 21/3691 |
| 2019/0340445 A1* | 11/2019 | Roy Chowdhury | ... G06V 10/50 |

FOREIGN PATENT DOCUMENTS

| | | | | |
|---|---|---|---|---|
| DE | 102013222634 | A1 | 5/2015 | |
| EP | 2407357 | A1 * | 1/2012 | ............... B60T 7/22 |
| EP | 2407357 | A1 | 1/2012 | |
| KR | 20140133162 | A | 11/2014 | |

\* cited by examiner

ROAD FRICTION ESTIMATION TECHNIQUES

CROSS REFERENCE TO RELATED APPLICATIONS

The present application claims the benefit of priority to U.S. Provisional Patent Application No. 62/902,851 filed Sep. 19, 2019. The entire content of the before-mentioned patent application is hereby incorporated by reference as part of the disclosure if this patent document.

TECHNICAL FIELD

This document relates to systems, apparatus, and methods to estimate friction between a road and a vehicle.

BACKGROUND

Autonomous vehicle navigation is a technology that can allow a vehicle to sense the position and movement of vehicles around an autonomous vehicle and, based on the sensing, control the autonomous vehicle to safely navigate towards a destination. An autonomous vehicle may operate in several modes. In some cases, an autonomous vehicle may allow a driver to operate the autonomous vehicle as a conventional vehicle by controlling the steering, throttle, clutch, gear shifter, and/or other devices. In other cases, a driver may engage the autonomous vehicle navigation technology to allow the vehicle to be driven by itself.

SUMMARY

When a vehicle is driven, the vehicle's operations is dependent at least in part on a condition of the road that can depend on weather conditions. This patent document describes systems, apparatus, and methods to estimate friction between a road and a vehicle that may be operating on the road. An in-vehicle control computer located in the vehicle can use at least the estimated road friction to determine vehicle driving operations.

An exemplary road friction estimation method comprises receiving, from a temperature sensor on a vehicle, a temperature value that indicates a temperature of an environment in which a vehicle is operated; determining a first range of friction values that quantify a friction between a road and tires of a vehicle based on a function of the temperature value and an extent of precipitation in a region that indicate a hazardous driving condition, where the first range of friction values indicate an extent of precipitation on the road; obtaining, from the first range of friction values, a value that quantifies the friction between the road and the tires of the vehicle, wherein the value is obtained based on a driving related behavior of the vehicle; and causing the vehicle to operate on the road based on the value obtained from the first range of friction values.

The following features may be present in the method in any reasonable combination. In some embodiments, the value is obtained based at least on determining that the vehicle is decelerating and an anti-lock brake system (ABS) of the vehicle is engaged to minimize skidding of the tires. In some embodiments, the value is obtained based at least on determining that the vehicle is accelerating and a traction control system (TCS) of the vehicle is engaged to minimize skidding of the tires.

In some embodiments, the first range of friction values is determined based on the function of the temperature value and the extent of precipitation in the region by: receiving, from a camera located on the vehicle, an image of a region where the vehicle is being operated; determining, from the image, the extent of precipitation in the region; determining, based on the extent of precipitation determined from the image, second range of friction values that quantify the friction between the road and the tires of the vehicle; and in response to determining that the temperature value is less than a pre-determined temperature, obtaining the first range of friction values from the second range of friction values. In some embodiments, the first range of friction values are narrower than the second range of friction values. In some embodiments, the extent of precipitation is determined from the image by determining that pixel size of raindrops exceeds a threshold size or by determining that a number of pixels indicating rain or snow is greater than a threshold value. In some embodiments, the second range of friction values are narrower for when an extent of rain or snow is determined than when a presence of rain or snow is determined.

In some embodiments, the first range of friction values is determined based on the function of the temperature value and the extent of precipitation in the region by: receiving a weather report that indicates the extent of precipitation in the region where the vehicle is being operated; determining, based on the indicated extent of precipitation in the weather report, second range of friction values that quantify the friction between the road and the tires of the vehicle; and in response to determining that the temperature value is less than a pre-determined temperature, obtaining the first range of friction values from the second range of friction values, where the first range of friction values are narrower than the second range of friction values.

In some embodiments, the first range of friction values and the second range of friction values are based at least in part on a setting of wiper blades on the vehicle. In some embodiments, the value is obtained based at least on determining that the vehicle is decelerating and the ABS of the vehicle is engaged by: receiving sensor data that indicates that the vehicle is decelerating; receiving a signal that indicates that the ABS of the vehicle is engaged; and obtaining, based on a brake pressure applied to the vehicle that engaged ABS and a speed of the vehicle, the value that quantifies the friction between the road and tires of the vehicle.

In some embodiments, the value is obtained based at least on determining that the vehicle is accelerating and the TCS of the vehicle is engaged by: receiving sensor data that indicates that the vehicle is accelerating; receiving a signal that indicates that the TCS of the vehicle is engaged; and obtaining, based on a torque applied by an engine of the vehicle, the value that quantifies the friction between the road and tires of the vehicle.

In some embodiments, In some embodiments, the causing the vehicle to operate based on the value obtained from the first range of friction values comprises: sending instruction to an engine of the vehicle to reduces a speed of the vehicle to be less than a pre-determined speed, wherein the instruction is sent to the engine upon determining that the value obtained from the first set of values is less than a pre-determined value. In some embodiments, the causing the vehicle to operate based on the value obtained from the first range of friction values comprises: sending instruction to brakes of the vehicle to decelerate the vehicle at a rate less than a pre-determined rate, wherein the instruction is sent to the brakes upon determining that the value obtained from the first set of values is less than a pre-determined value. In some embodiments, the causing the vehicle to operate based on the value obtained from the first range of friction values comprises: sending instructions to the engine of the vehicle that accelerates the vehicle at an acceleration value that is less than a pre-determined acceleration value, wherein the instruction is sent to the engine upon determining that the value obtained from the first set of values is less than a pre-determined value. In some embodiments, the causing the vehicle to operate based on the value obtained from the first range of friction values comprises: sending instruction to a steering motor to steer the vehicle at a rate that is less than a pre-determined steering rate, wherein the instruction is sent to the steering motor upon determining that the value obtained from the first set of values is less than a pre-determined value.

In some embodiments, the receiving the temperature value, the determining the first range of friction values, and the obtaining the value are performed while the vehicle is being driven on the road or in response to the vehicle being first turned on.

In yet another exemplary aspect, the above-described method is embodied in a non-transitory computer readable storage medium comprising code that when executed by a processor, causes the processor to perform the methods described in this patent document.

In yet another exemplary embodiment, a device that is configured or operable to perform the above-described methods is disclosed.

The above and other aspects and their implementations are described in greater detail in the drawings, the descriptions, and the claims.

DETAILED DESCRIPTION

Figure 1:
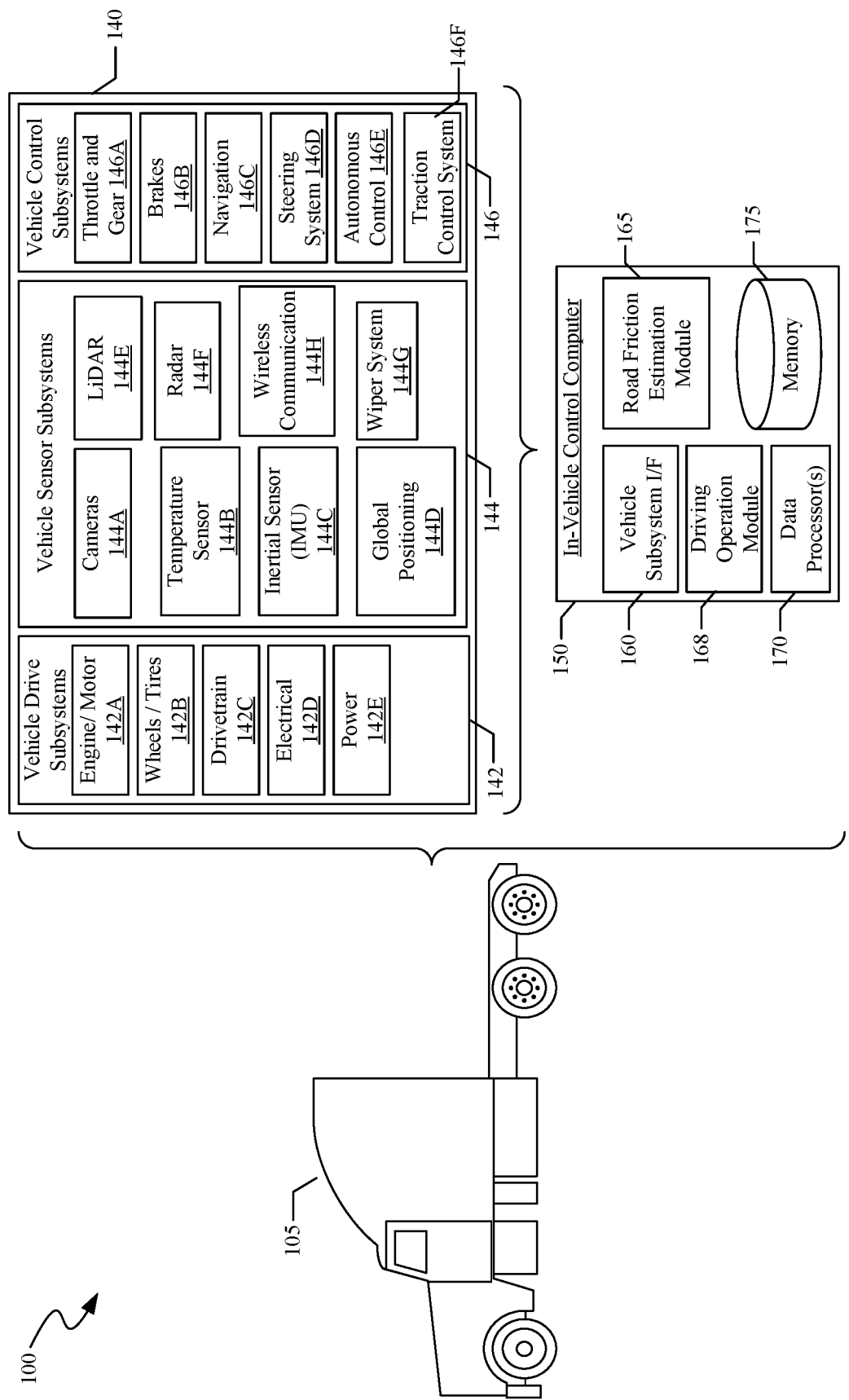
FIG. 1 shows a block diagram of an example vehicle ecosystem in which driving operations can be determined based on estimating friction between a road and a vehicle.

Developments in autonomous driving technology have led to a development of semi-trailer truck that can be autonomously driven to deliver goods to a destination. When a semi-trailer truck is driven to its destination, the semi-trailer truck can experience different types of weather that can affect its driving related operations. For example, if a semi-trailer truck is driven through an area having a dry sunny climate and then through another area where it is raining, such differing weather conditions can affect the driving related operations such as acceleration, deceleration, speed, and/or steering of the semi-trailer truck.

The patent document describes techniques to estimate friction between a road and the semi-trailer truck that may be operating on the road. Based on the estimated road friction, an in-vehicle control computer located in the semi-trailer truck can determine safe vehicle driving operations for a vehicle operated in an autonomous mode. In some embodiments, based on the estimated road friction, the in-vehicle control computer can reduce a current speed of the vehicle to be less than a pre-determined speed, decelerate the vehicle at a rate less than a pre-determined rate, accelerate the engine of the vehicle at an acceleration value less than a pre-determined acceleration value, and/or steer the vehicle at a rate that is less than a pre-determined steering rate. Thus, one of the benefits of the technology described in this patent document is that it can improve safety of a vehicle as the vehicle is driven in an autonomous mode or in a driver-controlled mode through any weather condition.

An in-vehicle control computer can operate in one of several modes to control devices in the semi-trailer truck. For example, in an autonomous mode, the in-vehicle control computer controls various devices or systems of the semi-trailer truck to operate the semi-trailer truck without much intervention from a driver. In some implementations, in an autonomous mode, the in-vehicle control computer can perform image processing on images obtained from cameras on the semi-trailer truck to determine the location of objects that surround the semi-trailer truck. Based on the image processing, the in-vehicle control computer can safely operate the semi-trailer truck by controlling a steering angle or a rate of change of the steering angle of the steering system, a throttle amount to control the speed of the vehicle, a transmission gear, and/or a braking amount to control the extent to which the brakes are engaged.

The in-vehicle control computer can operate in another mode known as the driver-controlled mode, where the in-vehicle control computer can enable a driver to manually operate the semi-trailer truck. In some implementations, in an autonomous mode and/or in a driver-controlled mode, the in-vehicle control computer can show relevant information on a display to a driver to keep the driver appraised of driving conditions and/or environment in which the semi-trailer truck is operating. For example, the relevant information may be distances to various objects (e.g., vehicles) in front of the semi-trailer truck, a LiDAR image obtained by the in-vehicle control computer from a LiDAR sensor, an image captured with cameras of an area in front of the semi-trailer truck where the image included bounding boxes around vehicles located in front of the semi-trailer truck.

The driving related operations of the semi-trailer truck such as steering angle or a rate of change of the steering angle, a throttle amount, and/or a braking amount are dependent at least in part on the friction between the road and the semi-trailer truck. Thus, the in-vehicle control computer can estimate the road friction based on techniques described in this patent document. In some embodiments, the in-vehicle control computer can use the road friction information to more effectively control the various devices and/or systems in the semi-trailer truck that is operated in the autonomous mode. In some embodiments, the in-vehicle control computer can display relevant information related to road friction to the driver in the autonomous mode or in the driver-controlled mode.

This patent document describes exemplary road friction estimation techniques. In a first exemplary embodiment, an estimated road friction value can be determined by performing image processing on an image obtained from a camera, by obtaining temperature of an environment in which the vehicle is operating, and by determining whether the vehicle has engaged its anti-lock braking system (ABS) if the vehicle is decelerating or whether the vehicle has engaged its traction control system (TCS) if the vehicle is accelerating. In a second exemplary embodiment, an estimated road friction value can be determined by obtaining a weather report that describes an extent of precipitation in an area where the vehicle is being operated, by obtaining temperature of an environment in which the vehicle is operating, and by determining whether the vehicle has engaged its ABS if the vehicle is decelerating or whether the vehicle has engaged its TCS if the vehicle is accelerating. In this patent document, the term "extent of precipitation" may include an absence of precipitation; a presence of rain, snow, sleet, hail, and the like; or an amount of rain, snow, and the like.

FIG. 1 shows a block diagram of an example vehicle ecosystem 100 in which driving operations can be determined based on estimating friction between a road and a vehicle 105. As shown in FIG. 1, the vehicle 105 may be a semi-trailer truck. The vehicle ecosystem 100 includes several systems and components that can generate and/or deliver one or more sources of information/data and related services to the in-vehicle control computer 150 that may be located in a vehicle 105. The in-vehicle control computer 150 can be in data communication with a plurality of vehicle subsystems 140, all of which can be resident in the vehicle 105. A vehicle subsystem interface 160 is provided to facilitate data communication between the in-vehicle control computer 150 and the plurality of vehicle subsystems 140. In some embodiments, the vehicle subsystem interface 160 can include a controller area network (CAN) controller to communicate with devices in the vehicle subsystems 140.

The vehicle 105 may include various vehicle subsystems that support of the operation of vehicle 105. The vehicle subsystems may include any of a vehicle drive subsystem 142, a vehicle sensor subsystem 144, and a vehicle control subsystem 146. The components or devices of the vehicle drive subsystem 142, the vehicle sensor subsystem 144, and the vehicle control subsystem 146 as shown as examples. In some embodiment, additional components or devices can be added to the various subsystems or one or more components or devices (e.g., LiDAR or Radar shown in FIG. 1) can be removed without affecting the road friction estimation related features described in this patent document. The vehicle drive subsystem 142 may include components operable to provide powered motion for the vehicle 105. In an example embodiment, the vehicle drive subsystem 142 may include an engine or motor 142A, wheels/tires 142B, a powertrain including a drivetrain 142C (e.g., transmission), an electrical subsystem 142D, and a power source 142E.

The vehicle sensor subsystem 144 may include a number of sensors configured to sense information about an environment or condition of the vehicle 105. As further explained in this patent document, the road estimation module 165 in the in-vehicle control computer 150 can estimate road friction based on information provided by sensors in the vehicle sensor subsystem 144. The vehicle sensor subsystem 144 may include any of the following: one or more cameras or image capture devices 144A, one or more temperature sensors 144B, an inertial measurement unit (IMU) 144C, a Global Positioning System (GPS) transceiver 144D, a laser range finder/LiDAR unit 144E, a Radar unit 144F, a wiper system 144G, and a wireless communication unit (e.g., a cellular communication transceiver) 144H. The vehicle sensor subsystem 144 may also include sensors configured to monitor internal systems of the vehicle 105 (e.g., an $O_2$ monitor, a fuel gauge, an engine oil temperature, etc.).

The IMU 144C may include any combination of sensors (e.g., accelerometers and gyroscopes) configured to sense position and orientation changes of the vehicle 105 based on inertial acceleration. The GPS transceiver 144D may be any sensor configured to estimate a geographic location of the vehicle 105. For this purpose, the GPS transceiver 144D may include a receiver/transmitter operable to provide information regarding the position of the vehicle 105 with respect to the Earth. The Radar unit may represent a system that utilizes radio signals to sense objects within the local environment of the vehicle 105. In some embodiments, in addition to sensing the objects, the Radar unit may 144F additionally be configured to sense the speed and the heading of the objects proximate to the vehicle 105. The laser range finder or LiDAR unit 144E may be any sensor configured to sense objects in the environment in which the vehicle 105 is located using lasers. The cameras 144A may include one or more devices configured to capture a plurality of images of the environment of the vehicle 105. The cameras 144A may be still image cameras or motion video cameras.

The vehicle control subsystem 146 may be configured to control operation of the vehicle 105 and its components. Accordingly, the vehicle control subsystem 146 may include various elements such as any of the following: a throttle and gear 146A, a brake unit 146B, a navigation unit 146C, a steering system 146D, an autonomous control unit 146E, and a traction control system 146F. The vehicle may be an internal combustion engine vehicle or an electric powered vehicle that derives current from a battery or batteries, fuel cell, photovoltaic cell, or an internal combustion engine. In the case of an electric vehicle, a single transmission may not be present, as motors or actuators may be present on each axle of the vehicle or even on each of the wheels. The throttle may be configured to control, for instance, the operating speed of the engine and, in turn, control the speed of the vehicle 105. The gear 146A may include an input, such as a gear selecting lever or shifter, configured to control the gear selection of the transmission. The brake unit 146B can include any combination of mechanisms configured to decelerate the vehicle 105. The brake unit 146B can use friction to slow the wheels in a standard manner. The brake unit 146B may include an Anti-lock brake system (ABS) that can prevent the brakes from locking up when the brakes are applied. The navigation unit 146C may be any system configured to determine a driving path or route for the vehicle 105. The navigation unit 146C may additionally be configured to update the driving path dynamically while the vehicle 105 is in operation. In some embodiments, the navigation unit 146C may be configured to incorporate data from the GPS transceiver 144D and one or more predetermined maps so as to determine the driving path for the vehicle 105. The steering system 146D may represent any combination of mechanisms that may be operable to adjust the heading of vehicle 105 in an autonomous mode or in a driver-controlled mode.

The autonomous control unit 146E may represent a control system configured to identify, evaluate, and avoid or otherwise negotiate potential obstacles in the environment of the vehicle 105. In general, the autonomous control unit 146E may be configured to control the vehicle 105 for operation without a driver or to provide driver assistance in controlling the vehicle 105. In some embodiments, the autonomous control unit 146E may be configured to incorporate data from the GPS transceiver 144D, the Radar 144F, the LiDAR 144E, the cameras 144A, and/or other vehicle subsystems to determine the driving path or trajectory for the vehicle 105.

The traction control system (TCS) 146F may represent a control system configured to prevent the vehicle 105 from swerving or losing control while on the road. For example, TCS 146F may obtain signals from the IMU 144C and the engine torque value to determine whether it should intervene and send instruction to one or more brakes on the vehicle 105 to mitigate the vehicle 105 swerving. TCS 146F is an active vehicle safety feature designed to help vehicles make effective use of traction available on the road, for example, when accelerating on low-friction road surfaces. When a vehicle without TCS attempts to accelerate on a slippery surface like ice, snow, or loose gravel, the wheels can slip and can cause a dangerous driving situation. TCS may also be referred to as electronic stability control (ESC) system.

Many or all of the functions of the vehicle 105 can be controlled by the in-vehicle control computer 150. The in-vehicle control computer 150 may include at least one data processor 170 (which can include at least one microprocessor) that executes instructions stored in a non-transitory computer readable medium, such as a memory 175. The in-vehicle control computer 150 may also represent a plurality of computing devices that may serve to control individual components or subsystems of the vehicle 105 in a distributed fashion. In some embodiments, the memory 175 may contain instructions (e.g., program logic) executable by the data processor 170 to perform various methods and/or functions of the vehicle 105, including those described for the road friction estimation module 165 and the driving operation module 168 as explained in this patent document. For instance, the data processor 170 executes the operations associated with road friction estimation module 165 for determining an estimated road friction value based on sensor data. And, the data processor 170 executes the operations associated with driving operation module 168 for determining various driving related operations of the vehicle 105 based on the estimated road friction value determined by the road friction estimation module 165.

The memory 175 may contain additional instructions as well, including instructions to transmit data to, receive data from, interact with, or control one or more of the vehicle drive subsystem 142, the vehicle sensor subsystem 144, and the vehicle control subsystem 146. The in-vehicle control computer 150 can be configured to include a data processor 170 and a memory 175. The in-vehicle control computer 150 may control the function of the vehicle 105 based on inputs received from various vehicle subsystems (e.g., the vehicle drive subsystem 142, the vehicle sensor subsystem 144, and the vehicle control subsystem 146).

As further explained in Sections A and B below, the road friction estimation module 165 can determine an estimated road friction value and the driving operation module 168 can control the driving related operations of the various elements or devices of the vehicle control subsystem 146 based on the estimated road friction value provided by the road friction estimation module 165.

A. Exemplary Techniques to Estimate Road Friction

As further described in this patent document, the in-vehicle control computer 150 includes a road estimation module 165 that can perform road friction estimation techniques based on information provided by sensors in the vehicle sensor subsystem 144. Based on the information obtained from the sensor, the road friction estimation techniques can estimate a road friction coefficient value. The example headings for the various sections below are used to facilitate the understanding of the disclosed subject matter and do not limit the scope of the claimed subject matter in any way. Accordingly, one or more features of one example section can be combined with one or more features of another example section.

I. First Exemplary Technique

In a first exemplary embodiment, the road estimation module 165 can determine an estimated road friction value by performing image processing on an image obtained from a camera, by obtaining temperature of an environment in which the vehicle 105 is operating, and by determining whether the vehicle 105 has engaged its anti-lock braking system (ABS) if the vehicle 105 is decelerating or whether the vehicle 105 has engaged its traction control system (TCS) if the vehicle 105 is accelerating.

The road estimation module 165 receives from an image from a camera coupled to a vehicle 105, where the image describes a region (e.g., region in front of the vehicle 105) while the vehicle 105 is driven on a road. The road estimation module 165 can determine from the image an extent of precipitation in an environment where the vehicle 105 is being driven by using image processing techniques. For example, the road estimation module 165 can determine the raindrop size, and thus, the extent of rain, by measuring the size of the pixels in an image that includes raindrops. In another example, the road estimation module 165 can convert the image obtained from the camera took picture to grayscale and can count the number of raindrops in the grayscale image.

The extent of precipitation can indicate to the road estimation module 165 that the vehicle 105 is being operated in dangerous or hazardous weather condition. If the road estimation module 165 determines that rain or snow are present in the image, then the road estimation module can determine a first range of road friction coefficient values (e.g., 0.1 to 0.6) that estimate amounts of friction between the road and the tires of the vehicle 105. In some embodiments, when the road estimation module 165 determines an extent of rain or snow exceeds a pre-determined limit (e.g., pixel size of raindrops are greater than a threshold size or number of pixels indicating rain or snow is greater than a threshold value), the road estimation module can determine a first range of road friction coefficient values which may be narrower (e.g., 0.1 to 0.3) than the road friction coefficient values that is determined when only the presence of rain or snow is determined. Thus, the road estimation module 165 can change the road friction coefficient value range based on the severity of the weather.

The road estimation module 165 can further narrow the first range of road friction coefficient values to better estimate road friction by obtaining a temperature measurement from a temperature sensor. The road estimation module 165 obtains from a temperature sensor the temperature of the environment in which the vehicle is operating. If the temperature sensor indicates to the road estimation module 165 that the temperature is below a pre-determined temperature (e.g., 0° C.), then the road estimation module 165 can determine that there may be ice or snow or water on the road and can further narrow the first range of coefficient values obtained from processing the image obtained from the camera. For example, if the temperature measured by the temperature sensor is −5° C., then the road estimation module 165 can obtain a second range of road friction coefficient values (e.g., 0.1 to 0.2) which may be narrower than or a proper subset of the first range of road friction coefficient values.

The road friction estimation module 165 can further refine the second range of road friction coefficient values to derive an estimated road friction value based on whether the vehicle 105 is accelerating or decelerating. In some embodiments, the road friction module 165 can determine that the vehicle 105 is decelerating based on a sensor data (e.g., bit value of 0) obtained from an IMU 144C in the vehicle 105. When the road friction module 165 determines that the vehicle 105 is decelerating, the road friction module 165 can determine an estimated road friction value based on obtaining an anti-lock braking system (ABS) status signal from the brakes 146B, the speed of the vehicle 105, and the previously applied brake pressure applied on the brakes. The determined estimated road friction value is within the second range of road friction coefficient values and can be based on a lookup table that provides an estimated road friction value based on the previously applied brake pressure to trigger or engage ABS and the current speed of the vehicle. An example lookup table that provides an estimated road friction value based on the applied brake pressure is shown in Table 1. Alternatively, or additionally, if the vehicle 105 is determined to be decelerating, the road friction module 165 can determine an estimated road friction value based on obtaining an anti-lock braking system (ABS) status signal from the brakes, the speed of the vehicle 105, and the currently applied brake pressure applied on the brakes.

TABLE 1

Exemplary Brake Pressure Applied to trigger ABS and estimated road friction values

| | Pressure(mbar) | | | |
|---|---|---|---|---|
| | 0 | 2000 | 4000 | 7000 |
| Road friction | N/A | 0.2 | 0.5 | 1 |

On slippery surface where road friction can be expected to be low, the vehicle 105 can engage its ABS easier with less brake pressure compared to a rough and dry surface on which the vehicle 105 can engage its ABS at a greater brake pressure. A vehicle can engage its ABS or goes into ABS mode where brake pressure can be modulated to prevent or minimize skidding of the tires. Thus, if the road estimation module 165 determines from an ABS status signal that the vehicle 105 has engaged its ABS, then the road estimation module 165 can determine that a value from the lookup table is the estimated road friction value based on the previously applied brake pressure and the current speed of the vehicle.

In some other embodiments, the road friction module 165 can determine that the vehicle 105 is accelerating based on a sensor data (e.g., bit value of 1) obtained from an IMU in the vehicle 105. If the vehicle 105 is determined to be accelerating, the road friction module 165 can determine an estimated road friction value based on a traction control system (TCS) status signal and a current engine torque value, both of which can be obtained over the CAN bus.

On slippery surface where the road friction coefficient value can be expected to be low, the vehicle 105 tends to engage its TCS with less engine torque compared to on a rough and dry surface on which the vehicle 105 can engage its TCS with more engine torque. A vehicle may engage its TCS to prevent or minimize skidding of the tires. Thus, if the road estimation module 165 determines from a TCS signal that traction control on the vehicle 105 has been activated for a vehicle 105, then the road estimation module 165 can determine that a value from another lookup table is the estimated road friction value based on the current engine torque applied by the engine and indicated by the engine to the road estimation module 165. An example lookup table that provides an estimated road friction value based on the engine torque is shown in Table 2.

TABLE 2

Engine torque to trigger TCS and estimated road friction values

| | Engine torque (%) | | | | |
|---|---|---|---|---|---|
| | 0 | 30 | 50 | 80 | 100 |
| Road friction | N/A | 0.2 | 0.5 | 1 | 1.2 |

II. Second Exemplary Technique

In a second exemplary embodiment, the road estimation module 165 can determine an estimated road friction value by obtaining a weather report that describes an extent of precipitation in an area where the vehicle 105 is being operated, and by determining whether the vehicle 105 has engaged its anti-lock braking system (ABS) if the vehicle 105 is decelerating or whether the vehicle 105 has engaged its traction control system (TCS) if the vehicle 105 is accelerating.

In the second exemplary embodiment, the road estimation module 165 can obtain a weather report from the Internet via the wireless communication unit. In an example implementation, the road estimation module 165 can obtain a location of the vehicle 105 from the GPS unit and can send a request to a weather reporting service to obtain a weather report for that location. The weather report can indicate an amount of rain or snow expected at that location. Based on the amount of rain or snow expected at that location, the road estimation module 165 can obtain a first range of road friction coefficient values.

The road friction estimation module 165 can further refine the first range of road friction coefficient values to derive an estimated road friction value based on whether the vehicle 105 is accelerating or decelerating using techniques involving the ABS signal or TCS signal as described in the first exemplary technique in Section A.(I).

In some embodiments for the first and second exemplary techniques, the road estimation module 165 can further refine the first range of road friction coefficient values based on the speed setting of the wiper blade. The wiper blade can operate at any one of an intermittent setting, a slow wiper setting, and a fast wiper setting, where these settings indicate the speed and/or frequency with which the wiper blades wipe rain or snow off of the windshield. For example, if the driver in the vehicle 105 sets the wiper blade to operate at a fast wiper setting, then that may indicate that the vehicle 105 is being operated in a severe rain or snow condition. In this example, the first range of road friction coefficient values can be 0.1 to 0.2. In another example, if the driver in the vehicle 105 sets the wiper blade to operate at an intermittent setting, then that may indicate that the vehicle 105 is being operated in an environment with not much rain or snow. In this second example, the first range of road friction coefficient values can be 0.1 to 0.5.

In some embodiments for the first and second exemplary techniques, the road estimation module 165 can perform the exemplary road friction estimation techniques described in this patent document in real-time (e.g., periodically every 5 seconds) or when the vehicle 105 is first turned on. For example, referencing FIG. 1 and FIG. 2, the road estimation module 162 may periodically perform at least operations 202 to 206 so that the driving operation module 168 can perform the causing operation 208 with the most recent friction coefficient value from the range of values to perform a driving related operation (e.g., such as acceleration, deceleration, speed, and/or steering of the semi-trailer truck).

Figure 2:
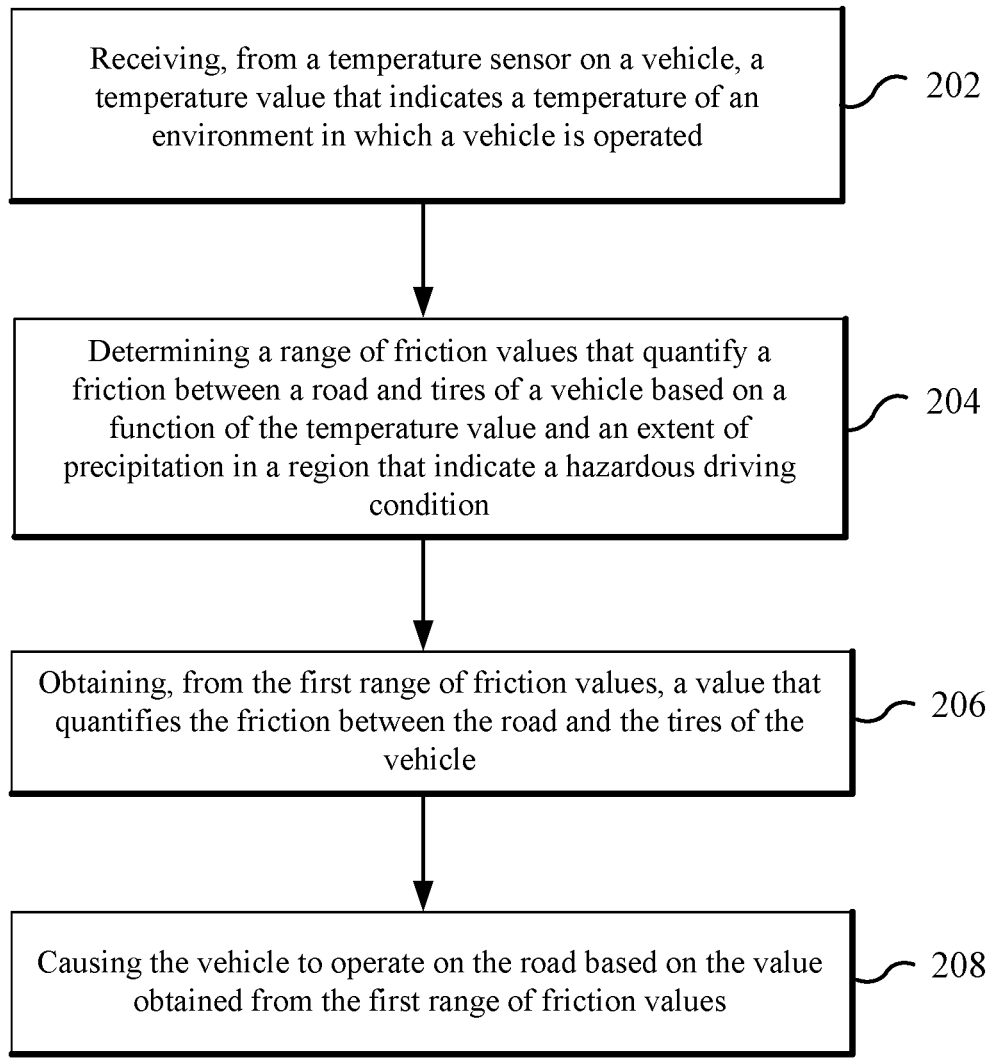
FIG. 2 shows a flow diagram of an exemplary technique to estimate road friction to perform driving related operations.

FIG. 2 shows a flow diagram of an exemplary technique to estimate road friction to perform driving related operations. The receiving operation 202 includes receiving, from a temperature sensor on a vehicle, a temperature value that indicates a temperature of an environment in which a vehicle is operated. The determining operation 204 includes determining a first range of friction values that quantify a friction between a road and tires of a vehicle based on a function of the temperature value and an extent of precipitation in a region that indicate a hazardous driving condition, where the first range of friction values indicate an extent of precipitation on the road.

The obtaining operation 206 includes obtaining, from the first range of friction values, a value that quantifies the friction between the road and the tires of the vehicle, where the value is obtained based on a driving related behavior of the vehicle. The causing operation 208 includes causing the vehicle to operate on the road based on the value obtained from the first range of friction values.

The value obtained at the obtaining operation 206 may be based at least on determining that the vehicle is decelerating and an anti-lock brake system (ABS) of the vehicle is engaged to minimize skidding of the tires. For example, the road estimation module may obtain the value based at least on determining that the vehicle is decelerating and the ABS of the vehicle is engaged by (1) receiving sensor data that indicates that the vehicle is decelerating, (2) receiving a signal that indicates that the ABS of the vehicle is engaged, and (3) obtaining, based on a brake pressure applied to the vehicle (e.g., previously applied brake pressure) that engaged ABS and a speed of the vehicle, the value that quantifies the friction between the road and tires of the vehicle.

The value obtained at the obtaining operation 206 may be based at least on determining that the vehicle is accelerating and a traction control system (TCS) of the vehicle is engaged to minimize skidding of the tires. For example, the road estimation module may obtain the value based at least on determining that the vehicle is accelerating and the TCS of the vehicle is engaged by (1) receiving sensor data that indicates that the vehicle is accelerating, (2) receiving a signal that indicates that the TCS of the vehicle is engaged, and (3) obtaining, based on a torque applied by an engine of the vehicle, the value that quantifies the friction between the road and tires of the vehicle.

The extent of precipitation can be determined from the image by determining that pixel size of raindrops exceeds a threshold size or by determining that a number of pixels indicating rain or snow is greater than a threshold value.

The first range of friction values can be determined based on the function of the temperature value and the extent of precipitation in the region by (1) receiving, from a camera located on the vehicle, an image of a region where the vehicle is being operated; (2) determining, from the image, the extent of precipitation in the region; (3) determining, based on the extent of precipitation determined from the image, second range of friction values that quantify the friction between the road and the tires of the vehicle; and (4) in response to determining that the temperature value is less than a pre-determined temperature, obtaining the first range of friction values from the second range of friction values. The second range of friction values may be narrower for when an extent of rain or snow is determined than when a presence of rain or snow is determined at least because a determination of the extent of rain or snow may more precisely indicate an amount of precipitation than a determination of a presence of rain or snow. For example, when the extent of rain or snow can be quantified, or is determined to be above a certain level, then the second range of friction values may be narrower than when this second range of friction values is based only a positive determination of the presence of precipitation without any severity or quantity associated with the precipitation. Alternatively, the first range of friction values may be narrower than the second range of friction values.

The first range of friction values can be determined based on the function of the temperature value and the extent of precipitation in the region by: (1) receiving a weather report that indicates the extent of precipitation in the region where the vehicle is being operated; (2) determining, based on the indicated extent of precipitation in the weather report, second range of friction values that quantify the friction between the road and the tires of the vehicle; and (3) in response to determining that the temperature value is less than a pre-determined temperature, obtaining the first range of friction values from the second range of friction values, where the first range of friction values are narrower than the second range of friction values. The first range of friction values and the second range of friction values are based at least in part on a setting of wiper blades on the vehicle.

The vehicle may be caused to operate based on the value obtained from the first range of friction values by sending instruction to one or more devices in the vehicle. For example, an instruction may be sent to an engine of the vehicle to reduces a speed of the vehicle to be less than a pre-determined speed, where the instruction is sent to the engine upon determining that the value obtained from the first set of values is less than a pre-determined value. In another example, an instruction may be sent to brakes of the vehicle to decelerate the vehicle at a rate less than a pre-determined rate, where the instruction is sent to the brakes upon determining that the value obtained from the first range of friction values is less than a pre-determined value. In yet another example, an instruction may be sent to the engine of the vehicle to accelerate the vehicle at an acceleration value that is less than a pre-determined acceleration value, where the instruction is sent to the engine upon determining that the value obtained from the first range of friction values is less than a pre-determined value. In yet another example, an instruction is sent to a steering motor to steers the vehicle at a rate that is less than a pre-determined steering rate, where the instruction is sent to the steering motor upon determining that the value obtained from the first range of friction values is less than a pre-determined value.

In FIG. 2, the receiving operation 202, the determining operation 204, and the obtaining operation 206 may be performed while the vehicle is being driven on the road or in response to the vehicle being first turned on. The operations described for FIG. 2 can be performed by a road friction estimation module 165 and/or driving operation module 168 of an in-vehicle control computer as described in FIG. 1 and in Sections A.(I) and/or A.(II).

B. Operating a Vehicle Based on the Estimated Road Friction Value

The road estimation module 165 can determine and provide an estimated road friction value to the driving operation module 168 in the in-vehicle control computer 150. Based on the estimated road friction value, the driving operation module 168 can limit or control driving operations to safety operate the vehicle 105. For example, if the estimated road friction value is less than a pre-determined value (e.g., 0.2), then the driving operation module 168 can send instruction to an engine of the vehicle 105 to reduce a current speed of the vehicle to be less than a pre-determined speed (e.g., 40 mph). In another example, if the estimated road friction value is less than a pre-determined value (e.g., 0.2), then the driving operation module 168 can, when needed, send instructions to the brakes the vehicle 105 to decelerate the vehicle 105 at a rate less than a pre-determined rate. In yet another example, if the estimated road friction value is less than a pre-determined value (e.g., 0.3), then the driving operation module 168 can send instructions to the engine of the vehicle that accelerates the engine of the vehicle 105 at an acceleration value less than a pre-determined acceleration value. In yet another example, if the estimated road friction value is less than a pre-determined value (e.g., 0.4), then the driving operation module 168 can send instruction to a steering motor(s) of a steering system to steer the vehicle at a rate that is less than a pre-determined steering rate.

In this document the term "exemplary" is used to mean "an example of" and, unless otherwise stated, does not imply an ideal or a preferred embodiment. In the patent document the term "semi-trailer truck" is used to describe features of estimating road friction to determine driving operation of the semi-trailer truck. However, the road friction estimation techniques described can be applied to other kinds of vehicles.

Some of the embodiments described herein are described in the general context of methods or processes, which may be implemented in one embodiment by a computer program product, embodied in a computer-readable medium, including computer-executable instructions, such as program code, executed by computers in networked environments. A computer-readable medium may include removable and non-removable storage devices including, but not limited to, Read Only Memory (ROM), Random Access Memory (RAM), compact discs (CDs), digital versatile discs (DVD), etc. Therefore, the computer-readable media can include a non-transitory storage media. Generally, program modules may include routines, programs, objects, components, data structures, etc. that perform particular tasks or implement particular abstract data types. Computer- or processor-executable instructions, associated data structures, and program modules represent examples of program code for executing steps of the methods disclosed herein. The particular sequence of such executable instructions or associated data structures represents examples of corresponding acts for implementing the functions described in such steps or processes.

Some of the disclosed embodiments can be implemented as devices or modules using hardware circuits, software, or combinations thereof. For example, a hardware circuit implementation can include discrete analog and/or digital components that are, for example, integrated as part of a printed circuit board. Alternatively, or additionally, the disclosed components or modules can be implemented as an Application Specific Integrated Circuit (ASIC) and/or as a Field Programmable Gate Array (FPGA) device. Some implementations may additionally or alternatively include a digital signal processor (DSP) that is a specialized microprocessor with an architecture optimized for the operational needs of digital signal processing associated with the disclosed functionalities of this application. Similarly, the various components or sub-components within each module may be implemented in software, hardware or firmware. The connectivity between the modules and/or components within the modules may be provided using any one of the connectivity methods and media that is known in the art, including, but not limited to, communications over the Internet, wired, or wireless networks using the appropriate protocols.

While this document contains many specifics, these should not be construed as limitations on the scope of an invention that is claimed or of what may be claimed, but rather as descriptions of features specific to particular embodiments. Certain features that are described in this document in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or a variation of a sub-combination. Similarly, while operations are depicted in the drawings in a particular order, this should not be understood as requiring that such operations be performed in the particular order shown or in sequential order, or that all illustrated operations be performed, to achieve desirable results.

Only a few implementations and examples are described and other implementations, enhancements and variations can be made based on what is described and illustrated in this disclosure.

What is claimed is:

1. A road friction estimation method, comprising:
receiving, from a temperature sensor on a vehicle, a temperature value that indicates a temperature of an environment in which a vehicle is operated;
determining a first range of friction values that quantify friction between a road and tires of a vehicle based on a function of the temperature value and an extent of precipitation in a region that indicate a hazardous driving condition,
wherein the first range of friction values are determined by:
determining, based on the extent of precipitation, a second range of friction values that quantify friction between the road and the tires of the vehicle, wherein the second range of friction values are narrower for when an extent of rain or snow is determined than when a presence of rain or snow is determined; and
in response to determining that the temperature value is less than a pre-determined temperature, obtaining the first range of friction values from the second range of friction values;
obtaining, from the first range of friction values, a value that quantifies friction between the road and the tires of the vehicle, wherein the value is obtained based on a driving related behavior of the vehicle; and
causing the vehicle to operate on the road based on the value obtained from the first range of friction values, wherein the causing the vehicle to operate based on the value obtained from the first range of friction values comprises:
sending instructions to the engine of the vehicle that accelerates the vehicle at an acceleration value that is less than a pre-determined acceleration value, wherein the instruction is sent to the engine upon determining that the value obtained from the first set of values is less than a pre-determined value.

2. The method of claim 1, wherein the value is obtained based at least on determining that the vehicle is decelerating and an anti-lock brake system (ABS) of the vehicle is engaged to minimize skidding of the tires.

3. The method of claim 2, wherein the value is obtained based at least on determining that the vehicle is decelerating and the ABS of the vehicle is engaged by:
receiving sensor data that indicates that the vehicle is decelerating;
receiving a signal that indicates that the ABS of the vehicle is engaged; and
obtaining, based on another value that indicates brake pressure applied to the vehicle that engaged ABS and a speed of the vehicle, the value that quantifies friction between the road and tires of the vehicle.

4. The method of claim 1, wherein the value is obtained based at least on determining that the vehicle is accelerating and a traction control system (TCS) of the vehicle is engaged to minimize skidding of the tires.

5. The method of claim 4, wherein the value is obtained based at least on determining that the vehicle is accelerating and the TCS of the vehicle is engaged by:
receiving sensor data that indicates that the vehicle is accelerating;
receiving a signal that indicates that the TCS of the vehicle is engaged; and
obtaining, based on a torque value that is related to a torque applied by an engine of the vehicle, the value that quantifies friction between the road and tires of the vehicle.

6. The method of claim 1, wherein the receiving the temperature value, the determining the first range of friction values, and the obtaining the value are performed while the vehicle is being driven on the road or in response to the vehicle being first turned on.

7. An apparatus for vehicle operation comprising a processor, configured to implement a method comprising:
receive, from a temperature sensor on a vehicle, a temperature value that indicates a temperature of an environment in which a vehicle is operated;
determine a first range of friction values that quantify friction between a road and tires of a vehicle based on a function of the temperature value and an extent of precipitation in a region that indicate a hazardous driving condition,
wherein the determine the first range of friction values is performed by the processor configured to:
determine, based on the extent of precipitation, a second range of friction values that quantify friction between the road and the tires of the vehicle, wherein the second range of friction values are narrower for when an extent of rain or snow is determined than when a presence of rain or snow is determined; and
in response to a determination that the temperature value is less than a pre-determined temperature, obtain the first range of friction values from the second range of friction values;
obtain, from the first range of friction values, a value that quantifies friction between the road and the tires of the vehicle, wherein the value is obtained based on a driving related behavior of the vehicle; and
cause the vehicle to operate on the road based on the value obtained from the first range of friction values, wherein the cause the vehicle to operate based on the value obtained from the first range of friction values is performed by the processor configured to:
send instructions to the engine of the vehicle that accelerates the vehicle at an acceleration value that is less than a pre-determined acceleration value, wherein the instruction is sent to the engine upon a determination that the value obtained from the first set of values is less than a pre-determined value.

8. The apparatus of claim 7, wherein the first range of friction values is determined based on the function of the temperature value and the extent of precipitation in the region by the processor configured to:
receive, from a camera located on the vehicle, an image of a region where the vehicle is being operated;
determine, from the image, the extent of precipitation in the region.

9. The apparatus of claim 8, wherein the extent of precipitation is determined from the image by the processor configured to determine that pixel size of raindrops exceeds a threshold size.

10. The apparatus of claim 8, wherein the extent of precipitation is determined from the image by the processor configured to determine that a number of pixels indicating rain or snow is greater than a threshold value.

11. The apparatus of claim 7, wherein the first range of friction values are narrower than the second range of friction values.

12. The apparatus of claim 7, wherein the extent of precipitation includes:
an absence of precipitation,
a presence of rain, snow, sleet or hail, or
an amount of rain or snow.

13. The apparatus of claim 7, wherein the vehicle is caused to operate based on the value obtained from the first range of friction values comprises the processor configured to:
send instruction to a steering motor to steer the vehicle at a rate that is less than a pre-determined steering rate, wherein the instruction is sent to the steering motor upon determining that the value obtained from the first set of values is less than the pre-determined value.

14. A non-transitory computer readable program storage medium having code stored thereon, the code, when executed by a processor, causing the processor to implement a method comprising:
receiving, from a temperature sensor on a vehicle, a temperature value that indicates a temperature of an environment in which a vehicle is operated;
determining a first range of friction values that quantify friction between a road and tires of a vehicle based on a function of the temperature value and an extent of precipitation in a region that indicate a hazardous driving condition,
wherein the first range of friction values are determined by:
determining, based on the extent of precipitation, a second range of friction values that quantify friction between the road and the tires of the vehicle, wherein the second range of friction values are narrower for when an extent of rain or snow is determined than when a presence of rain or snow is determined; and
in response to determining that the temperature value is less than a pre-determined temperature, obtaining the first range of friction values from the second range of friction values;
obtaining, from the first range of friction values, a value that quantifies friction between the road and the tires of the vehicle, wherein the value is obtained based on a driving related behavior of the vehicle; and causing the vehicle to operate on the road based on the value obtained from the first range of friction values, wherein the causing the vehicle to operate based on the value obtained from the first range of friction values comprises:

sending instructions to the engine of the vehicle that accelerates the vehicle at an acceleration value that is less than a pre-determined acceleration value, wherein the instruction is sent to the engine upon determining that the value obtained from the first set of values is less than a pre-determined value.

15. The non-transitory computer readable program storage medium of claim 14, wherein the first range of friction values is determined based on the function of the temperature value and the extent of precipitation in the region by:

receiving a weather report that indicates the extent of precipitation in the region where the vehicle is being operated;

wherein the first range of friction values are narrower than the second range of friction values.

16. The non-transitory computer readable program storage medium of claim 14, wherein the first range of friction values and the second range of friction values are based at least in part on a setting of wiper blades on the vehicle.

17. The non-transitory computer readable program storage medium of claim 14, wherein the causing the vehicle to operate based on the value obtained from the first range of friction values comprises:

sending instruction to an engine of the vehicle to reduces a speed of the vehicle to be less than a pre-determined speed, wherein the instruction is sent to the engine upon determining that the value obtained from the first set of values is less than the pre-determined value.

18. The non-transitory computer readable program storage medium of claim 14, wherein the causing the vehicle to operate based on the value obtained from the first range of friction values comprises:

sending instruction to brakes of the vehicle to decelerate the vehicle at a rate less than a pre-determined rate, wherein the instruction is sent to the brakes upon determining that the value obtained from the first set of values is less than the pre-determined value.

\* \* \* \* \*

UNITED STATES PATENT AND TRADEMARK OFFICE
CERTIFICATE OF CORRECTION

PATENT NO. : 11,639,177 B2
APPLICATION NO. : 17/022875
DATED : May 2, 2023
INVENTOR(S) : Kun Zhang et al.

It is certified that error appears in the above-identified patent and that said Letters Patent is hereby corrected as shown below:

On the Title Page

• In Item (74), under "Attorney, Agent, or Firm", in Column 2, Line 2, delete "Mathews Perkins" and insert -- Mathews; Perkins --, therefor.

In the Specification

• In Column 1, Line 11, delete "if this" and insert -- in this --, therefor.

• In Column 2, Line 54, delete "In some embodiments, In some embodiments," and insert -- In some embodiments, --, therefor.

• In Column 2, Line 57, delete "reduces" and insert -- reduce --, therefor.

• In Column 3, Line 37, delete "vehicle." and insert -- vehicle; and --, therefor.

• In Column 5, Line 21, delete "support of the" and insert -- support the --, therefor.

• In Column 8, Line 3, delete "receives from an" and insert -- receives an --, therefor.

• In Column 12, Line 4, delete "only a" and insert -- only on a --, therefor.

• In Column 12, Line 28, delete "reduces" and insert -- reduce --, therefor.

• In Column 12, Line 44, delete "steers" and insert -- steer --, therefor.

• In Column 12, Line 53, delete "for" and insert -- in --, therefor.

• In Column 12, Line 64, delete "safety" and insert -- safely --, therefor.

Signed and Sealed this
Twenty-seventh Day of June, 2023

Katherine Kelly Vidal
*Director of the United States Patent and Trademark Office*

CERTIFICATE OF CORRECTION (continued)
U.S. Pat. No. 11,639,177 B2

In the Claims

- In Column 18, Line 9, in Claim 17, delete "reduces" and insert -- reduce --, therefor.